United States Patent
Sturm et al.

[15] 3,682,913
[45] Aug. 8, 1972

[54] PRODUCTION OF 5-AMINOPYRAZOLES SUBSTITUTED IN THE 1-POSITION

[72] Inventors: Hans Juergen Sturm; Herbert Armbrust, both of Gruenstadt, Germany

[73] Assignee: Badische Anilin & Soda-Fabrik Aktiengesellschaft, Ludwigshafen, Rhine, Germany

[22] Filed: March 16, 1970

[21] Appl. No.: 20,129

[30] Foreign Application Priority Data

March 19, 1969 Germany..........P 19 13 845.5

[52] U.S. Cl......260/256.4 N, 260/256.4 Q, 260/305, 260/306.8 R, 260/310, 424/251

[51] Int. Cl. ............................................C07d 51/42
[58] Field of Search........260/310 R, 306.8, 256.4 Q, 260/256.4 N, 305

*Primary Examiner*—Alex Mazel
*Assistant Examiner*—Jose Tovar
*Attorney*—Johnston, Root, O'Keeffe, Keil, Thompson & Shurtleff

[57] ABSTRACT

The production of 5-aminopyrazoles by reaction of malonodialdehyde dioxime with nitrous acid followed by reaction of the product thus obtained with a hydrazine compound. The compounds which can be prepared by the process according to the invention are valuable starting materials for the production of dyes and pesticides.

8 Claims, No Drawings

PRODUCTION OF 5-AMINOPYRAZOLES SUBSTITUTED IN THE 1-POSITION

The invention relates to a process for the production of 5-aminopyrazoles substituted in the 1-position by reaction of malonodialdehyde dioxime with nitrous acid followed by reaction of the product thus obtained with a hydrazine compound.

It is known from German Pat. Specification No. 1,065,850, East German Pat. Specification No. 32,301 and Helv. Chim. Acta, 41 (1958), 306 et seq. that 2-aryl-3-aminopyrazoles are obtained by treatment of N-aryl-N'-($\beta$-cyanoethyl)-hydrazines, in the presence of acids, with oxidizing agents and then with alkaline reagents. In all these methods, production is troublesome and uneconomic, and the iron salts used as oxidizing agents give, in the alkaline medium, difficulty separable precipitates. The yields of the end product, which is also difficult to separate, is therefore unsatisfactory. A combination of iron salts with hydrogen peroxide also does not obviate these difficulties.

It is an object of this invention to provide a new process for the production, in good yields and high purity, of 5-aminopyrazoles which are substituted in the 1-position by a simpler and more economical method.

This and other objects of the invention are achieved and 5-aminopyrazoles which are substituted in the 1-position and which have the general formula:

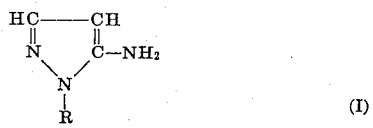

where R denotes an aromatic radical, a heterocyclic radical, an arylsulfonyl radical or the radical $S=C-NH_2$ are advantageously obtained by reacting malonodialdehyde dioxime with nitrous acid in a first stage and reacting the resultant reaction product in a second stage with a hydrazine compound having the general formula:

$$R-NH-NH_2 \quad \text{II.}$$

in which R has the above meaning.

When phenyl hydrazine is used, the reaction may be represented by the following equation:

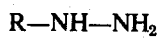

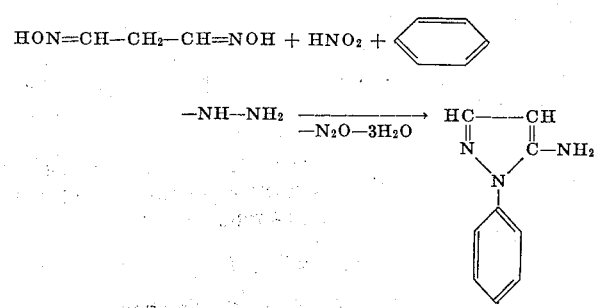

As compared with prior art methods, the process according to the invention provides 5-aminopyrazoles which are substituted in the 1-position in good yields and high purity by a simpler and more economical method.

In the first stage of the process, malonodialdehyde dioxime is reacted with nitrous acid, preferably in a molar ratio of 1 : 1 to 1 : 1.1. Substances which form nitrous acid under the reaction conditions, for example an acid such as acetic acid, sulfuric acid or hydrochloric acid and a nitrite such as sodium nitrite or potassium nitrite, may also be used instead of nitrous acid. The first stage of the reaction is expediently carried out at a temperature of from 0° to 10° C, preferably from 0° to 5° C.

The reaction product thus obtained is then reacted in the second stage with a hydrazine compound having the general formula (II), preferably in a ratio of one mole of starting material (II) to one mole of malonodialdehyde dioxime and at a temperature of from 0° to 70° C, particularly from 0° to 50° C. Preferred starting materials (II) and consequently preferred end products (I) are those in whose formula R denotes a phenyl radical, a five-membered or six-membered heterocyclic radical which may contain one or two nitrogen atoms, one oxygen atom and/or one sulfur atom, a phenylsulfonyl radical or the radical $S=C-NH_2$. A benzene ring may also be condensed on to the heterocyclic ring. The said radicals and rings may bear as substituents groups and/or atoms which are inert under the reaction conditions, for example chlorine atoms, bromine atoms, nitro groups, sulfonic acid groups, alkyl, alkylsulfonyl groups each having one to four carbon atoms.

For example the following hydrazine compounds may be used as starting materials (II):
phenylhydrazine, 4-toluylhydrazine, 3-nitrophenylhydrazine, 3-bromophenylhydrazine, 2-hydrazinobenzothiazole, thiosemicarbazide, benzenesulfohydrazide, 2-hydrazinothiazole, 4-hydrazinoquinazoline and 2-hydrazinopyrimidine.

Both stages of the reaction may be carried out at atmospheric or superatmospheric pressure, continuously or in batches. Water is usually used as the solvent, but organic solvents which are inert under the reaction conditions and are miscible with water, for example alkanols such as methanol or ethanol or carboxylic acids such as glacial acetic acid may be used. The pH in the second stage of the process is generally from 3 to 14 and towards the end of the reaction the pH of the reaction mixture should advantageously be adjusted to from 9 to 14 by adding an inorganic base, for example caustic soda or caustic potash solution.

The reaction may be carried out as follows:
malonodialdehyde dioxime, water and nitrous acid (or acid and a nitrite), with or without an organic solvent, are reacted for 30 to 90 minutes at the reaction temperature. It is advantageous then to remove any remaining unreacted nitrite, for example by adding the appropriate amount of urea. Then the starting material (II), with or without water, is added and the resultant mixture is reacted for 1 to 8 hours, preferably while slowly raising the temperature within the stated temperature range. It is expedient to raise the pH value by adding caustic alkali solution after gas evolution ($N_2O$) has ceased. The end product is then separated from the mixture by a conventional method; for example the mixture may be extracted with a suitable solvent such as methylene chloride or benzene, the organic phase separated, dried, evaporated and the residue thus obtained fractionally distilled. An end product is obtained which is already present in the mixture in solid form and can also be separated by filtration and recrystallization, for example from water, glacial acetic acid or mixtures of methanol and water.

Compounds which can be prepared by the process according to the invention are valuable starting materials for the production of dyes and pesticides. The said publications may be referred to for possible applications.

The following Examples, in which the parts are by weight, illustrate the invention.

EXAMPLE 1

A solution of 7 parts of sodium nitrite in 20 parts of water is added in portions while stirring and at 0° to 5° C to 10.2 parts of malonodialdehyde dioxime, 20 parts of water and 10 parts of glacial acetic acid. The mixture is stirred for another 30 minutes, nitrite residues are destroyed with 0.5 part of urea and then a solution of 10.8 parts phenyl hydrazine in 10 parts of water and 6 parts of glacial acetic acid is added all at once. The whole is stirred for two hours at 0° to 5° C and the temperature is raised to 35° C. The mixture is stirred until no more gas is evolved (about four hours), 24 parts of aqueous caustic soda solution of 40 percent by weight strength is added, the mixture is stirred for 3 hours at room temperature, extracted with methylene chloride or benzene, the organic phase separated, dried and evaporated. The residue is distilled and 11.4 parts (71.8 percent of the theory) of 1-phenyl-5-aminopyrazole is obtained having a boiling point of 120° to 130° C at 0.1 mm.

EXAMPLE 2

112 parts of malonodialdehyde dioxime is reacted, analogously to Example 1, in 400 parts of water and 110 parts of glacial acetic acid with a solution of 77 parts of sodium nitrite in 220 parts of water at 0° to 5° C. 157.3 parts of 4-chlorophenyl hydrazine is added and the temperature is allowed to rise to 40° C, the mixture being stirred until no more gas is evolved. The mixture is then neutralized with 370 parts of 40 percent by weight caustic potash solution, stirred for a few hours at 40° C and the end product is isolated analogously to Example 1.

148.5 parts (70.2 percent of the theory) of 1-(4'-chlorophenyl)-5-aminopyrazole is obtained having a boiling point of 138° to 141° C at 0.1 mm.

EXAMPLE 3

10.2 parts of malonodialdehyde dioxime is reacted in a first stage analogously to Example 1 and then 20 parts of sodium acetate and 33.7 parts (about 85 percent by weight) of phenyl hydrazine-4-sulfonic acid sulfate is added. 20 parts of water is then added and the mixture is stirred until no more gas is evolved. 150 parts of hydrochloric acid (38 percent by weight) is added, the whole is stirred for another hour, cooled and the mixture is suction filtered and the filter cake is dried. 22.5 parts (94 percent of the theory) of 5-aminopyrazole-1-phenyl-4'-sulfonic acid is obtained having a melting point of above 350° C after having been recrystallized from water.

|  | C | H | N | O | S |
|---|---|---|---|---|---|
| found: | 45.2 | 4.1 | 17.3 | 20.1 | 13.1 |
| calculated: | 45.2 | 3.8 | 17.5 | 20.1 | 13.4 |

EXAMPLE 4

10.2 parts of malonodialdehyde dioxime is reacted in a first stage analogously to Example 1 and then 10 parts of thiosemicarbazide is added at 15° C. Dinitrogen monoxide is disengaged and the temperature rises to 42° C. After the elimination of gas has ended (5 hours) the product is neutralized with 6 to 7 parts of aqueous 40 percent by weight caustic soda solution, 2 additional parts of 40 percent by weight caustic soda solution is added, the whole is stirred for 2 hours at room temperature, adjusted to a pH of 5 with acetic acid, cooled and suction filtered. 10.5 parts (74 percent of the theory) of 1-thiocarbonamido-5-aminopyrazole is obtained having a melting point of 97° to 99° C.

|  | C | H | N | S |
|---|---|---|---|---|
| found: | 34.4 | 4.1 | 39.5 | 22.3 |
| calculated: | 33.8 | 4.2 | 39.4 | 22.6 |

EXAMPLE 5

15.3 parts of p-nitrophenyl hydrazine, 20 parts of water and 10 parts of glacial acetic acid are added one after the other at 0° to 5° C to a mixture obtained from 10.2 parts of malonodialdehyde dioxime by reaction in a first stage analogously to Example 1. The whole is stirred for 5 hours at room temperature and for 2 hours at 30° to 40° C, cooled to 20° C, the mixture is neutralized with caustic soda solution and another 5 parts of 40 percent caustic soda solution is added. The mixture is then stirred for 3 hours at room temperature, adjusted to a pH of from 4 to 6 with glacial acetic acid, suction filtered and dried.

18.0 parts (88.3 percent of the theory) of 1-(4'-nitrophenyl)-5-aminopyrazole is obtained having a melting point of 134° to 136° C after recrystallization from water.

|  | C | H | N | O |
|---|---|---|---|---|
| found: | 52.9 | 4.1 | 26.7 | 16.3 |
| calculated: | 52.9 | 3.9 | 27.5 | 15.7 |

EXAMPLE 6

12.2 parts of p-tolyl hydrazine and 6 parts of glacial acetic acid are added to a mixture obtained from 10.2 parts of malonodialdehyde dioxime by reaction in the first stage of the process analogously to Example 1. The whole is stirred for 2.5 hours at room temperature and 1 hour at 40° to 50° C. The whole is cooled to room temperature, neutralized with caustic soda solution, another 5 parts of 40 percent by weight caustic soda solution is added, the whole stirred for 3 hours at room temperature and the end product is isolated analogously to Example 1.

9.1 parts (52.6 percent of the theory) of 1-(4'-methylphenyl)-5-aminopyrazole is obtained which has a boiling point of 156° C at 0.4 mm.

EXAMPLE 7

A solution of 17.8 parts of 2-hydrazino benzothiazole in 50 parts of glacial acetic acid is added, at 5° C, to a mixture obtained analogously t Example 1 from 10.2 parts of malonodialdehyde dioxime. The temperature rises over 2 hours to 32° C. The mixture is then stirred for 2 hours at 40° C, cooled and suction filtered. 19.0 parts (88 percent of the theory) of 1-(2'- benzothiazolyl)-5-aminopyrazole is obtained having a melting point of 173° to 174° C after recrystallization from glacial acetic acid.

|  | C | H | N | S |
|---|---|---|---|---|
| found: | 55.6 | 4.0 | 25.4 | 14.6 |
| calculated: | 55.5 | 3.7 | 25.9 | 14.8. |

EXAMPLE 8

17.2 parts of benzenesulfonic hydrazide is added to a mixture obtained by reaction in the first stage of the process from 10.2 parts of malonodialdehyde dioxime in analogy to Example 1. The mixture is stirred for 4 hours, the temperature rising to 33° C, cooled, suction filtered and the filter cake is dried. 18.0 parts (80.8 percent of the theory) of 1-benzenesulfonyl-5-aminopyrazole is obtained which has a melting point of 140° to 141° after recrystallization from a mixture of equal parts of methanol and water.

We claim:
1. Process for the production of 5-aminopyrazoles which are substituted in the 1-position and which have the formula:

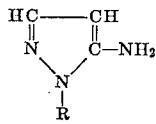

(1)

where R denotes an aromatic radical, a heterocyclic radical, an arylsulfonyl radical or the radical S=C—NH$_2$, wherein malonodialdehyde dioxime is reacted in a first stage with nitrous acid and the reaction product thus obtained is reacted in a second stage with a hydrazine compound having the formula:

where R has the meanings given above.

2. A process as claimed in claim 1 wherein the nitrous acid is formed is situ in the reaction mixture from a nitrite and an acid.

3. A process as claimed in claim 1 wherein the reaction with nitrous acid is carried out in a molar ratio of 1 : 1 to 1 : 1.1.

4. A process as claimed in claim 1 carried out in the first stage at a temperature of from 0° to 5° C.

5. A process as claimed in claim 1 wherein the second stage of the reaction is carried out at a temperature of from 0° to 70° C.

6. A process as claimed in claim 1 wherein the second stage of the reaction is carried out at from 0° to 50° C.

7. A process as claimed in claim 1 wherein 1 mole of starting material (II) is used for each mole of malonodialdehyde dioxime.

8. A process as claimed in claim 1 carried out in the presence of an organic solvent which is miscible with water and which is inert under the reaction conditions.

* * * * *